March 26, 1940.　　　J. W. THOMPSON　　　2,194,623
ATTACHMENT FOR APPREHENDING MOTOR VEHICLES
Filed Jan. 11, 1938　　　2 Sheets-Sheet 1

INVENTOR
JOSEPH W. THOMPSON
By David E. Loffman
ATTORNEY

March 26, 1940.         J. W. THOMPSON                2,194,623
            ATTACHMENT FOR APPREHENDING MOTOR VEHICLES
                    Filed Jan. 11, 1938          2 Sheets-Sheet 2
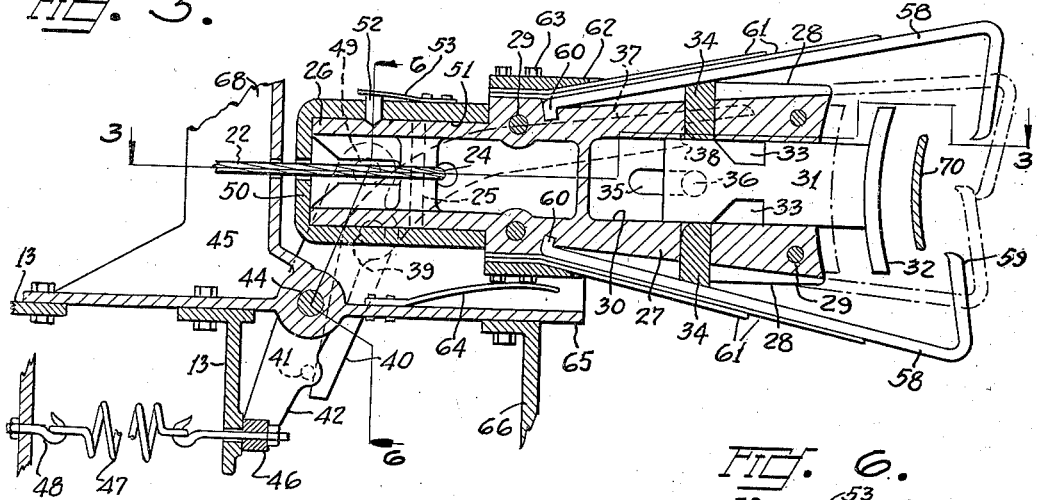
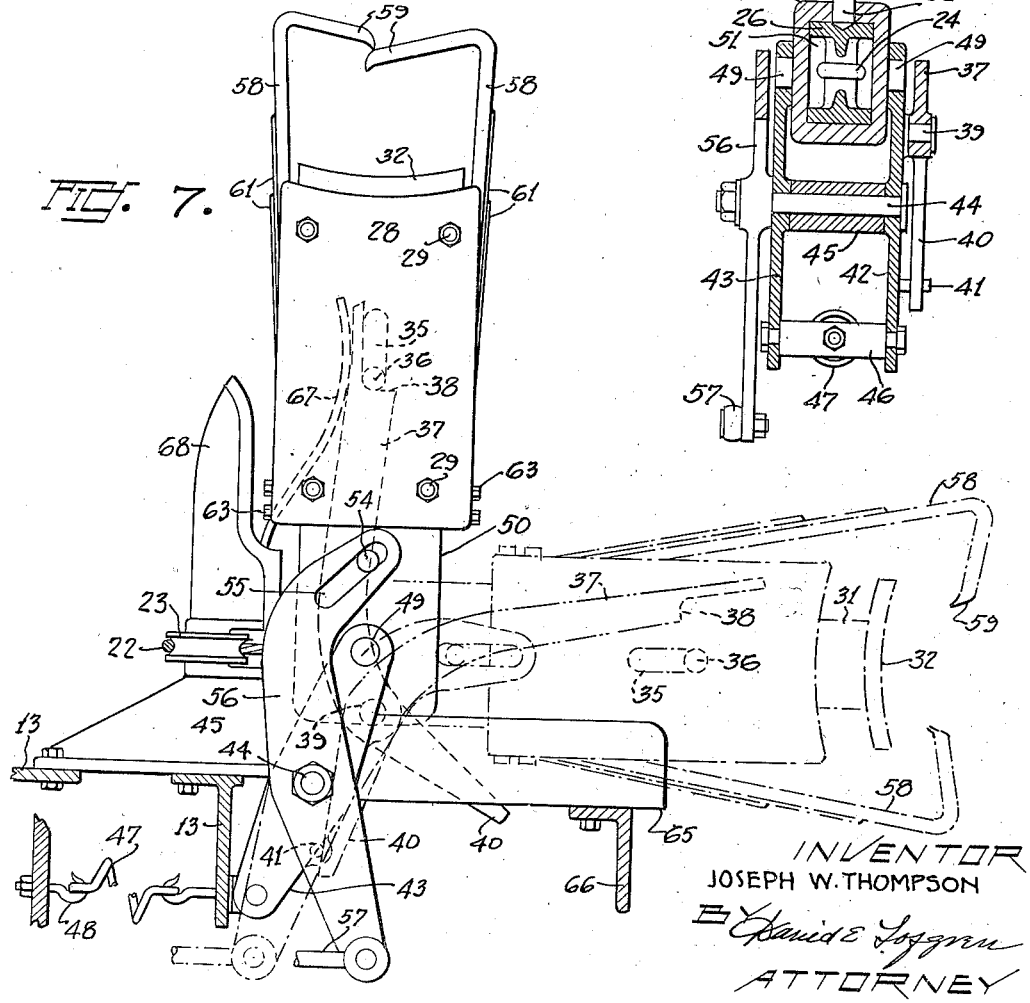
INVENTOR
JOSEPH W. THOMPSON
ATTORNEY Patented Mar. 26, 1940

2,194,623

UNITED STATES PATENT OFFICE 2,194,623

ATTACHMENT FOR APPREHENDING MOTOR VEHICLES

Joseph W. Thompson, Portland, Oreg., assignor of one-fourth to David E. Lofgren, Portland, Oreg.

Application January 11, 1938, Serial No. 184,491

8 Claims. (Cl. 280—33.15)

This invention is directed to an improvement in means whereby a pursuing vehicle may overtake and establish connection with a fleeing vehicle to stop or at least so retard its movement as to prevent its freedom.

It often happens that police and other cars of authority in overtaking or approaching a vehicle, the occupants of which they desire to investigate, find it difficult to compel the fleeing vehicle to stop, particularly where there is more or less continuous traffic, tending to prevent the pursuing vehicle getting in front of the fleeing vehicle and blocking its passage.

The present invention is directed to an improvement to be carried by the pursuing vehicle, through the manipulation of which the pursuing vehicle may be connected to the fleeing vehicle and thus, through the retardation of its own speed, compel the fleeing vehicle to come to a stop or be so retarded in speed that it cannot easily escape.

The invention comprises as a more specific detail an attaching element involving hook-like members which, when the device is in operative position, are open to grasp or embrace the rear bumper or other appropriate part of the fleeing vehicle automatically under contact between the device and such bumper or the like; the attaching element per se having flexible controllable connection with the pursuing vehicle to enable the pursuing vehicle to be controlled in making turns or the like without danger from unexpected turns or like movement of the fleeing vehicle.

The invention is illustrated in the accompanying drawings, in which:

Figure 5 is a vertical section on the line 5—5 of Figure 3.

Figure 6 is a transverse section on the line 6—6 of Figure 5.

Figure 7 is an enlarged elevation of the device showing the parts in inoperative position in full lines and in operative position in dotted lines.

Figure 2:
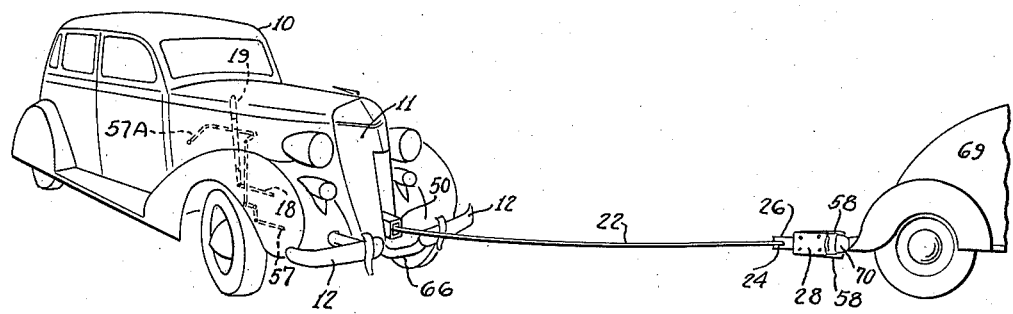
Figure 2 is a similar view showing the device connected to a fleeing vehicle with a flexible connection forming the means by which the travel of the fleeing vehicle is controlled from the pursuing vehicle.
Figure 1:
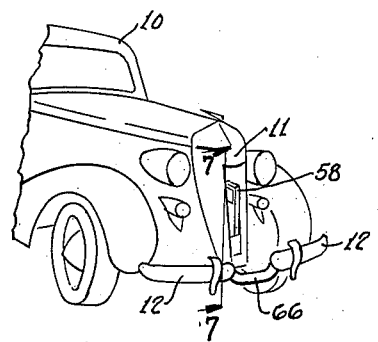
Figure 1 is a broken perspective of what will be hereinafter termed the pursuing vehicle, showing the device mounted in an inoperative position in the extreme forward portion of the vehicle.
Figure 4:
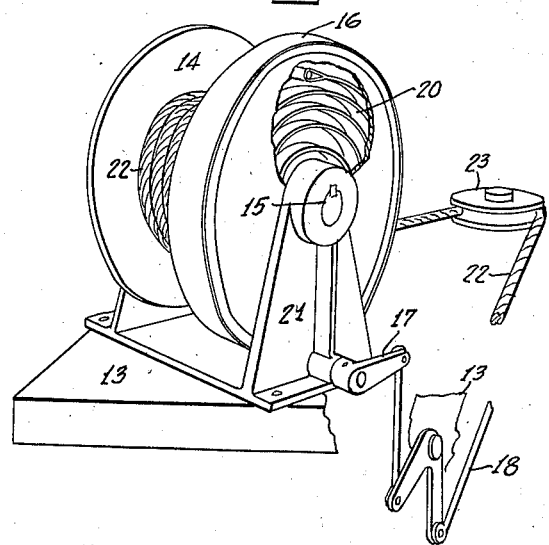
Figure 4 is a perspective view of the cable drum broken out to show the means for taking up slack in the connecting cable and illustrating the braking means for controlling the movement of the drum.

In the forward portion of the controlling vehicle 10, preferably in the grill front 11 of the radiator, is formed a housing open toward the front and including a bottom 65 rigidly mounted on appropriate supports 13 and 66 and having a rear upstanding wall 68. The housing has side walls 45 and between the side walls is mounted for swinging movement a carrier 50 in the form of a rectangular element closed at the rear end except for the cable opening and open at the forward end.

This carrier 50 is supported upon spaced levers 42 and 43 carried on a pivot 44 mounted in the base 65 of the housing, the upper or forward ends of the levers receiving pivot pins 49 extending from diametrically opposite points of the carrier 50, the lower or rear ends of the levers 42 and 43 being connected by a transverse bar 46 for a purpose which will later appear. The carrier thus mounted is capable of being moved into an inoperative or upright position, as illustrated in full lines in Figure 7, or in an operative or horizontal position, as indicated in Figure 5.

Slidably housed in the carrier 50, and freely movable through the open free end thereof under circumstances to be described, is a connector element in the form of a casting indicated generally at 27. This connector element has at its rear end spaced plates 26 which slidably fit in the carrier and which are retained therein against casual separation by pin 52 mounted in the carrier and cooperating with notch 51 in the plate 26, the pin being normally held in operative position by spring 53. The connector element 27 is thus temporarily secured to the carrier 50 but may be readily separated therefrom by a pull in the forward direction. This temporary connection facilitates the assembly of the parts in the inoperative position when they are being moved into the housing and prevents casual separation of the connector element 27 from the carrier when the device is moved to an operative position.

The plates 26 of the connector element 27 in advance of that portion of such plates fitting within the carrier 50, are thickened to present a shoulder to bear on the free edge of the carrier and divergent outer surfaces.

The spaced plates of the connector element forward of the portions of the plates fitting within the carrier have side plates 28 secured in place by bolts 29 to render the forward portion of the connector a hollow sleeve-like structure. Swingingly supported by their rear hooked ends 60 in appropriate recesses in the upper and lower plates of the connector element are connecting levers 58. These levers have a width approximating that of the upper and lower plates of the connector element and their forward ends, which extend beyond the connector element, are bent toward each other and inclined toward the connector element, as at 59, the free ends being slightly hooked, as shown.

An actuator 31 is mounted for sliding movement in the forward portion of the connector element, being provided at its rear end with a pin 36 slidable in slots 35 in the side plates 28 to limit the movement of the actuator in both directions. Oppositely disposed plugs 34 are slidably mounted in transversely aligned openings in the upper and lower plates of the connector element, these plugs engaging the connecting levers 58.

Recesses 33 are formed in the actuator of such depth and so located that when the recesses are in line with the plugs 34, the latter are free to move inwardly to the desired extent. The rear walls of the recesses 33 are inclined, so that as the actuator moves forwardly, the plugs, and more particularly the rounded edges thereof, are caused by the inclined wall of the recesses to be forced outwardly until the plugs bear on the full diameter thickness of the actuator, as illustrated in Figure 5 of the drawings.

Plates 62 are secured by bolts 63 to the upper and lower plates of the connector element, the forward end of the plates 62 being cut away to permit movement of the levers 58 and said plates 62 securing the rear ends of springs 61 which overlie and bear on the levers 58 and move said levers toward each other in the absence of the moving influence of the plugs 34. The actuator 31 is formed at its forward end with a concave head 32 which is arranged beyond the end of the connector element and is designed to engage or contact with the bumper or other appropriate part of the fleeing vehicle, indicated more particularly at 70 in Figure 5.

It will be apparent that when the actuator is at its forward limit of movement, that is with the pin 36 at the forward end of the slot 35, the plugs 34 will be held fully projected and the levers 58 moved to their outer limits against the influence of the springs 61, and further that when the actuator 31 is moved to its inward limit, that is with the pin 36 engaging the inner wall of the slot 35, as for example where the head 32 contacts with the bumper or other part of the fleeing vehicle, the recesses 33 will be in line with the plugs 34 and thus free to move inwardly and permit the springs 81 to move the levers 58 toward each other or into the dotted line positions shown in Figure 5.

A lever 56 is pivotally supported in the housing on pivot pin 44 on which the levers 42 and 43 are mounted. This lever 56 is formed at its upper end with a slot 55 engaging a pin 54 on one side of the carrier. In normal or inoperative position, when the parts are in the housing, the end of the lever 56 below the pivot is forward of the pivot, as illustrated in Figure 7. When the lower end of the lever is moved rearwardly, that is toward the body of the vehicle 10, the carrier 50 and the connector element carried thereby is moved from the normal inoperative vertical position, shown in full lines in Figure 7, to the operative horizontal position shown in dotted lines in Figure 7.

An actuator operating lever 37 is pivotally supported intermediate its ends on a pivot 39 mounted on the lever 42. The forward end of the lever 37 is cut away at 38 to provide a shoulder which is in position to engage a projecting portion of the pin 36 of the actuator 31, as illustrated more particularly in Figure 3. The lower end of the lever 37, that is the end below the pivot 39, is indicated at 40 and in the movement of the carrier and connector element from normal to operative position, the lower end 40 of the lever 37 is designed to engage a fixed pin 41 to limit the further movement of the lever 37.

As the lever 37 has a different fulcrum from that on which the carrier 50 is mounted, it is apparent that the lever 37 in the movement of the carrier and connector element from normal to operative position will compel movement of the pin 36 and thereby of the actuator 31 to the position indicated in Figure 5, whereby the plugs are forced outwardly to spread the levers 56. As the lower end 40 of the lever 37 engages the pin 41 before the carrier and connector element reach the full operative position, that end of the lever 37 which engages the pin 36 is withdrawn from cooperation with the pin, permitting free movement of the actuator under impact with the bumper or like element of the fleeing car, this position of the element 37 being indicated in dotted lines in Figure 7.

The housing is provided with a spring 64 to cushion the connector element as it is moved to operative position and to support it in that position while the housing is provided with a spring 67 which, as the parts are returned to normal position, engages lever 37 and moves it into operative cooperation with the pin 36.

A cable spool 14 is mounted upon a portion of the base of the housing, indicated at 13, and on this spool is wound a cable 22 which, due to the offset position of the spool relative to the housing proper, is carried around an idler 23 and passes through an opening in the bottom of the carrier 50 and connected through an eye in one of the struts 25, so that the cable is connected to the connector element. The spool is provided with a drum having a conventional brake 16 and within which is housed a coil spring 20 with one end secured to the axle 15 of the spool and the other end to the drum plate, whereby the spool is tensioned as the cable is unwound. The strength of the spring is sufficient to take care of any slack in the cable when the same is extended, rewinding the spool to take up such slack.

The lever 56 is appropriately connected by lever mechanism 57 to an element 57a within the car 10 through the manipulation of which the device may be turned from a normal inoperative position to an operative position. The brake band 16 is controlled through appropriate lever mechanism 18 leading to a handle 19 within the car 10, so that the rotation of the spool and thereby the paying out of the cable may be controlled at will. The levers 42 and 43 are connected to the forward end of a coil spring 47, the opposite end of which is anchored at 48 to absorb the shock of impact in the operation of the device.

Figure 3:
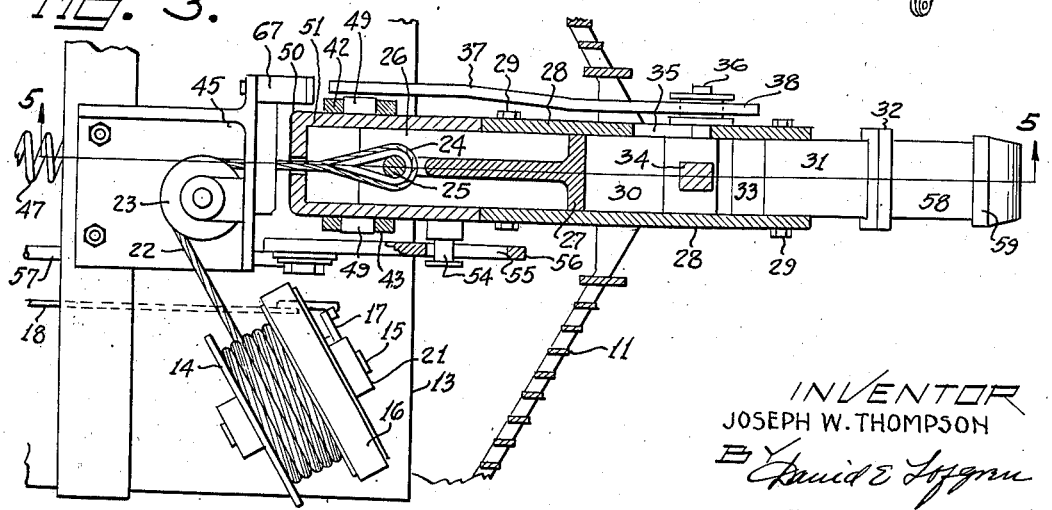
Figure 3 is a sectional view, partly broken away, taken on the line 3—3 of Figure 5.

Assuming the parts in normal or inoperative position, as indicated in full lines in Figure 7, it will be noted that the device as a whole is arranged vertically and that the levers 58 are in closed position, the cable 22 being wound upon the spool 14, as shown in Figure 3. In this position of the parts, the spring 67 has forced the operative end of the lever 37 in rear of or below the pin 36 of the actuator which is now at its inward limit, permitting the levers 58 to be at their inward limits. When it is desired to use the attachment, the lever 57ª on the vehicle 10 is actuated, moving the lever 56 to swing the carrier 50 and the supported connector element into the horizontal position indicated in dotted lines in Figure 7.

During this movement of the attachment, the lever 37, incident to the difference in fulcrum mounting with the lever 56, has compelled a forward or operative movement of the actuator 31. Of course, as a matter of fact, the lever 37 does not move forwardly or rearwardly but its effect on the pin 36 is incident to the relative movement between the connector element and the carrier and the lever 37 due to the difference in fulcrums. Incident to this movement of the lever 37, the actuator 31 is moved outwardly or forwardly, compelling the plugs 34 to move outwardly and so spread the levers 58 and separate the free ends of the inturned portions of such levers, as indicated in full lines in Figure 5.

When the fleeing vehicle has been approached sufficiently close to cause the head 32 of the actuator 31 to be brought into impact contact with the rear bumper or other appropriate part of the fleeing vehicle, which part is indicated at 70 in Figure 5, and in which position of contact it will be noted that the inturned ends of the levers 58 are well beyond such bumper 70 or like part, the impact will move the actuator rearwardly to register the depressions 33 and the plugs 34. The levers 58, under the influence of the spring 61, are free to move and will immediately close into the position shown in dotted lines in Figure 5 and thus connect the bumper or other part 70 and the attachment.

If the pursuing vehicle on which the attachment is mounted now retards its speed, the connector element as a whole will be withdrawn from the carrier 50 and the cable 22 drawn out from the spool against the tension of the compensating spring 20. The limit to which the cable may be withdrawn is obviously controlled by the driver or other occupant of the pursuing vehicle by use of the brake lever 19. Under these conditions, the pursuing vehicle, by braking or retarding its own travel, may compel a corresponding influence on the fleeing vehicle while at the same time the flexible cable connecting them guards against any liability of damage to the pursuing vehicle incident to any sudden turn or the like made by the fleeing vehicle in an attempt to escape. When the fleeing vehicle has been brought to a stop, the attachment may be manually disconnected by raising the levers 58, the spring 20 permitted to rewind the cable on the spool 14 and the connector element again placed within the carrier 50 and the whole returned to normal position within the housing of the pursuing car.

The improved structure provides a means by which a pursuing car, as for example a police car, may readily overtake and connect itself to a fleeing car without the necessity of getting out of the line of traffic and possibly without the knowledge of the occupants of the fleeing car. This is an advantage, particularly to the police and other like authorities, as they can overtake and compel a fleeing car to stop without getting into the line of traffic coming in the opposite direction or without creating a condition tending to wreckage.

What is claimed to be new is:

1. An attachment for motor vehicles whereby such vehicle may be connected to an advance vehicle, comprising a carrier, a connector element removably supported in the carrier, gripping levers carried by the connector element, an actuator movable in the connector element, means whereby movement of the actuator in one direction will spread the free ends of the gripping levers apart, said means under movement of the actuator in the opposite direction permitting the levers to move into gripping relation, means carried by the connector element for moving the levers into gripping cooperation when free to act, and means for normally holding the carrier and parts supported thereby in a position at right angles to its operative position.

2. An attachment for motor vehicles whereby such vehicle may be connected to an advance vehicle, comprising a carrier, a connector element removably supported in the carrier, gripping levers carried by the connector element, an actuator movable in the connector element, means whereby movement of the actuator in one direction will spread the free ends of the gripping levers apart, said means under movement of the actuator in the opposite direction permitting the levers to move into gripping relation, means carried by the connector element for moving the levers into gripping cooperation when free to act, a housing in the vehicle in which the carrier, connector element and carried parts may be housed at will, and means for normally holding the carrier and parts supported thereby at right angles to its operative position, said means acting to hold the actuator in a position to permit a gripping relation of the levers.

3. A construction as defined in claim 2, including manually operable means for moving the carrier and connector element relative to the housing to arrange the connector element and carried parts in operative arrangement in advance of the vehicle.

4. A construction as defined in claim 2, wherein manually operable means are provided for moving the carrier and connector element relative to the housing to dispose the connector element and carried parts in operative position in advance of the vehicle, together with means for automatically moving the actuator during such movement of the carrier and connector element to spread the levers into non-gripping relation.

5. A construction as defined in claim 2, wherein the carrier is pivotally supported in the housing and wherein the connector element is slidably supported in the carrier, including a lever to be manually operated for moving the carrier and connector element relative to the housing to dispose the connector element in advance of the vehicle.

6. A construction as defined in claim 2, wherein the carrier is pivotally supported in the housing and wherein the connector element is slidably supported in the carrier, including a lever to be manually operated for moving the carrier and connector element relative to the housing to dispose the connector element in advance of the vehicle, and a second lever automatically operable in the said movement of the carrier and connector element to operate the actuator to a position to spread the gripping ends of the levers.

7. A construction as defined in claim 2, wherein the carrier is pivotally supported in the housing and wherein the connector element is slidably supported in the carrier, including a lever to be manually operated for moving the carrier and connector element relative to the housing to dispose the connector element in advance of the vehicle, a second lever automatically operable in the said movement of the carrier and connector element to operate the actuator to a position to spread the gripping ends of the levers, and means on the housing to cooperate with the second lever to move said lever free of the actuator prior to the carrier and connector element reaching operative position.

8. An attachment for a motor vehicle whereby such vehicle may be connected at will with an advance vehicle, including a carrier, means for movably supporting the carrier to permit it to be moved into an inoperative position or into an operative position at right angles to its inoperative position, a connector element slidably mounted in the carrier, and gripping levers carried by the connector element, an actuator slidably mounted in the connector element, lugs mounted for transverse movement in the connector element and engaging the levers, means on the actuator to engage the lugs and force the same in movement of the actuator in one direction to spread the gripping levers to an inoperative position, said actuator being formed with recesses to permit inward movement of the lugs in a predetermined position of the actuator to relieve operative influence of the lugs on the levers, and springs for moving the levers to gripping relation in the absence of lug-spreading influence thereon.

JOSEPH W. THOMPSON.